United States Patent [19]

Hauff

[11] 4,078,834
[45] Mar. 14, 1978

[54] WALL DUCT ASSEMBLY

[76] Inventor: Werner Hauff, In den Stegwiesen 18, Herbrechtingen, Germany, 7922

[21] Appl. No.: 737,027

[22] Filed: Oct. 29, 1976

[30] Foreign Application Priority Data

Oct. 31, 1975  Germany ............... 2548807

[51] Int. Cl.² .............................. F16L 5/00
[52] U.S. Cl. .......................... 285/212; 277/112; 277/113; 285/158; 285/348
[58] Field of Search ............ 285/189, 196, 211, 212, 285/158, 374, 348, 205, 206, 208, 161; 277/112, 113, 123

[56]  References Cited

U.S. PATENT DOCUMENTS

| 1,364,814 | 1/1921 | Saucke | 285/208 |
| 2,525,799 | 10/1950 | Hecker | 285/374 X |
| 2,744,559 | 5/1956 | Leonetti | 285/196 X |
| 3,261,624 | 7/1966 | Hackman | 285/374 X |
| 3,612,578 | 10/1971 | Bagnulo | 285/374 X |

Primary Examiner—Werner H. Schroeder
Assistant Examiner—Moshe I. Cohen
Attorney, Agent, or Firm—Karl F. Ross

[57] ABSTRACT

A wall duct assembly is disclosed comprising a duct piece or unit having arranged on its outside diameter retaining grooves for sealing structures. The sealing structures can be adjusted through the aid of pressure rings to provide effective sealing of the duct unit in walls or like structures.

11 Claims, 4 Drawing Figures

WALL DUCT ASSEMBLY

FIELD OF THE INVENTION

The present invention relates to wall ducts and, more particularly, to duct pieces or units which can be mounted or secured into walls or similar structures for the passage therethrough of electrical or other wiring, piping and the like, either directly or with the aid of retainer pieces.

BACKGROUND OF THE INVENTION

Ducts of the type briefly defined in the foregoing are shown, for example, in German Gebrauchsmuster (utility model) No. 7,308,228. In that proposal an outer annular shoulder or abutment, formed integrally with the duct tubing, serves to form an opening which in turn receives a packing or seal and a retaining ring for the retention in fixed position of the seal or packing. Provision is thus made for the relative positioning and the positive sealing of inserts or retainers with which the cables, pipes or the like are positioned in the duct tubing.

In order to ensure proper sealing, the outer surface of the duct tubing is coated with a porous and elastic material which, on the one hand, will adhere to the tubing while, on the other hand, it will allow concrete, cement or the like to permeate to the extent required to effect an integral bond between the duct tubing and the final wall structure, which bond will not be adversely affected by drying or settling of the surrounding material.

The seal provided in this prior art proposal does not, however, significantly contribute to such a bond since it cannot be compressed axially.

In general, the duct according to this prior art proposal has been accepted relatively well in its respective market. However, it directs attention to the requirement that a seal means must be provided between the duct tubing and the wall structure that will withstand, under conditions of varying humidity and pressure of gases, as are normally prevailing in a environment in which it will be employed, these adverse conditions. That is to say, the seal must be effective against pressures that exceed 1/10 atmospheres. The structure of the prior art devices does not meet this requirement and can therefore be utilized in depths below 1 meter below the groundwater level only conditionally.

OBJECTS OF THE INVENTION

It is therefore an object of the present invention to provide an improved duct unit of the type just described.

Another object is the provision of an improved duct which is easily installed.

Yet another object is the provision of a duct which provides an effective seal under high pressure conditions between the duct and the wall structure into which it is mounted or secured by mortar, cement or like.

SUMMARY OF THE INVENTION

According to the present invention a duct piece or unit is provided which comprises an external groove or opening for the retention therein of a seal ring or member. The seal ring or member is brought into effective sealing contact by a pressure plate and the resulting force, when adjusting the seal ring or member, is countered by a counter-surface. This arrangement results in an effective pressure-positioning of the duct unit in the wall opening prior to cementing into place of the unit and will ensure a pressure tight seal.

In a preferred embodiment of the invention the counter-surface is provided by a circular plate having a counter-surface which is oppositely arranged, in axial direction, with respect to the groove-forming skirting.

A second seal ring or member can be provided between the counter-surface and the wall portion that it faces which seal will thus be subjected to the pressure corresponding to the pressure on the seal ring or member first described.

Furthermore, the respective retaining means for the two seals can be formed integrally with the duct piece or unit or as separate, individual packing members which can be joined with the duct piece or unit as required by welding, bonding or the like.

In a further embodiment the invention can be modified to arrange the counter-surface integrally with the means for forming the external groove on the duct, thus providing the most compact configuration of the unit.

As well, fastening means and adjustment means are contemplated by the present invention which will permit relative adjustment of the sealing pressure to be achieved.

The advantages of the present invention reside in the following:

Upon tightening the unit, with the pressure means just referred to, the seal ring or member in the external groove of the duct and the counter-surface, either alone or in conjunction with a second seal ring or member, are subjected to a sealing pressure which serves to ensure that a tight clamping action is exerted by the respective pressure surfaces. Thus, the unit will be safe for operation and utilization even under high external pressure conditions, exerted by gases or fluids up to 8 to 10 atmospheres, approximately.

The construction of the unit is relatively simple and the unit can be used with different inserts or retainers for holding the cable, piping or the like in place.

The unit can be embedded as is normal using mortar, cement or the like.

In contradistinction to prior art devices, the outer surface of the duct piece requires no special treatment or conditioning. In fact, in order to permit unrestricted tightening of the assembly, such surface modification should be avoided.

The tight and secure seal is then further adjusted by the normal settling and/or contracting of the solidifying wall material which will exert further sealing pressure.

BRIEF DESCRIPTION OF THE DRAWINGS

The above and other objects, features and advantages of the present invention will become readily apparent from the following description, reference being made to the accompanying drawing in which.

SPECIFIC DESCRIPTION

Figure 1:
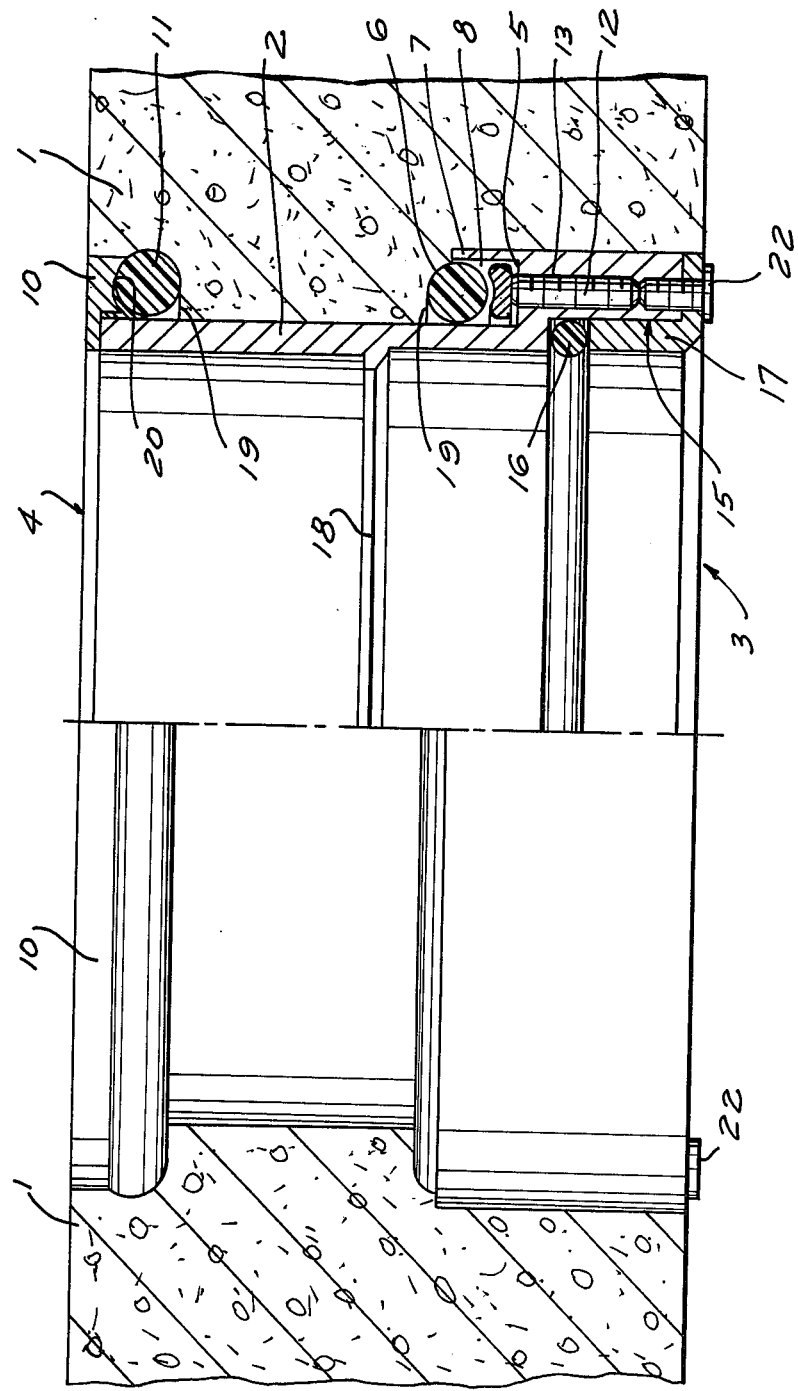
FIG. 1 is a cross-section through a wall or similar structure showing, partially in cross-section a duct and seal arrangement according to the present invention (unitary shoulder)

Alike parts in the embodiments shown in the Figures are designated by like reference numerals. Thus, numeral 1 designates a wall or similar building feature. The tubular duct unit is designated by numeral 2. The duct 2 is cemented or otherwise securely mounted or fastened to wall 1 (e.g. by being cast in place) and corresponds in length to the thickness of wall structure 1. Towards service end or opening end 3 a radially outwardly projecting shoulder or abutment 5 is provided which serves to retain an elastic seal ring or member 6.

Concentric with respect to duct 2 a skirting (axially extending annular apron) 7 forms, in conjunction with shoulder 5, in the direction of the opposite end, designated 4, an annular opening or groove 3. This groove is sealed as can be seen in FIG. 1 by the seal 6 which can be a O-ring or similar-shaped seal.

Between seal 6 and shoulder 5 a pressure plate or ring 9 is arranged which can be shifted in axial direction as will be described in more detail below. The pressure plate 9 can be brought into pressure contact against the seal 6. The axial reaction force on duct 2 thus produced by the assembly is taken up by a counterplate or ring (flange) 10 and is thence transmitted to wall 1. The counterplate 10 has a concave or similar shaped shoulder 20, depending on the cross-section of seal 11, as can best be seen with reference to FIGS. 1 and 2.

Against the shoulder 20 a second seal ring or member, designated 11 can be abutted, which seal 11 is retained in a corresponding opening in the wall prior to surrounding thereof by the wall material.

Shoulder 5 and face or shoulder 20 comprising counterplate 10 are either formed as integral parts of the duct 2 or separately.

In FIG. 1 it is shown that the groove 8 is formed in a flange portion of duct 2 while the counterplate 10 is cemented or welded to the end 4 of duct 2, thus representing the integral configuration. As suggested by FIGS. 2 to 4, shoulder 5 and skirting 7, together forming the groove 8, can also be components of a separate packing body or sleeve 21 which can be secured to duct 2 by welding, glueing or the like to provide for a secure and tight connection in service.

Figure 3:
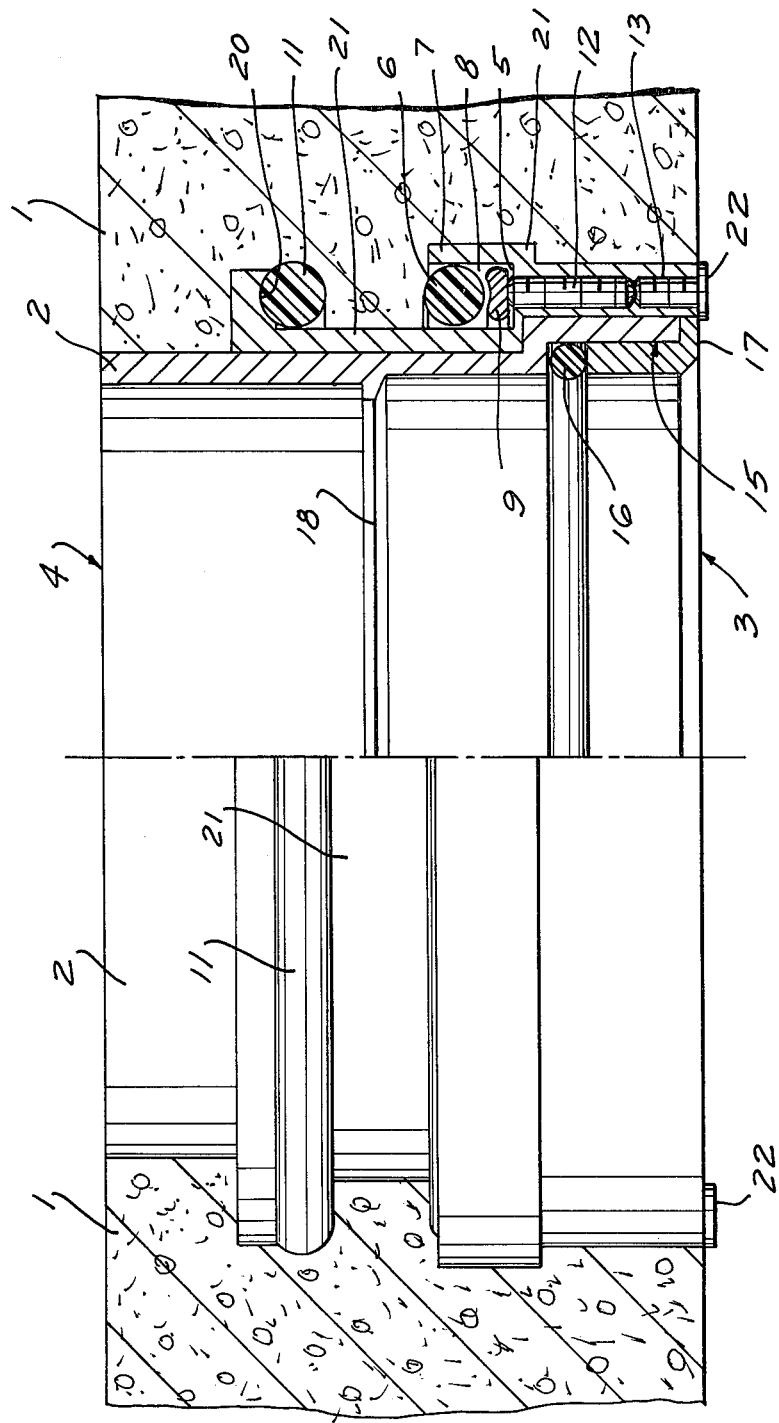
FIG. 3 shows still another embodiment of the present invention (separate unitary shoulder)
Figure 4:
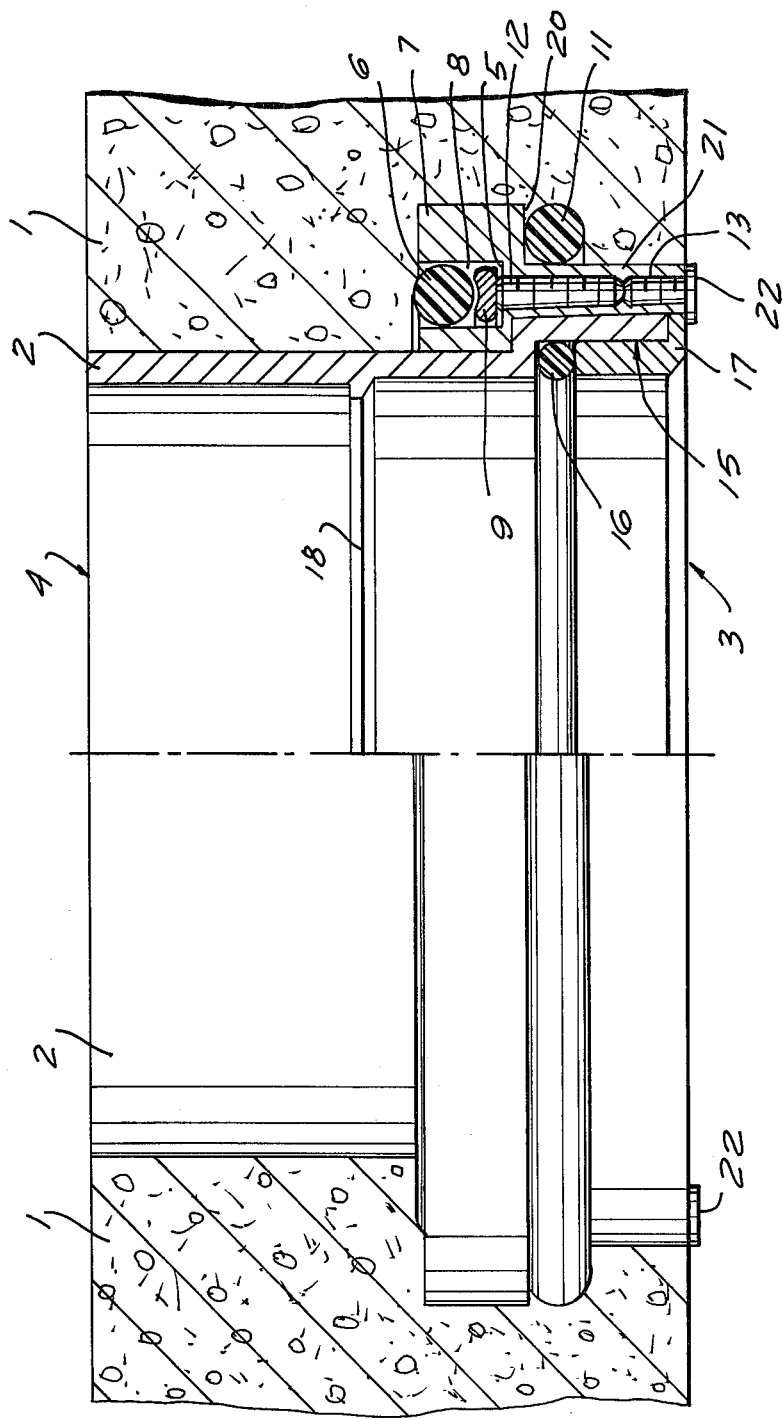
FIG. 4 shows a different embodiment with repositioned counter-surface seal arrangement (seal of packing).

As is shown in FIGS. 3 and 4, sleeve 21 can also be formed such that it will provide the counterface for seal 11. This is achieved by repositioning the seal 11 to abut against flat counter-shoulder 20 as is shown in FIG. 4. For purpose of comparison, this embodiment represents the most compact assembly according to the present invention. As shown in FIG. 3, sleeve 21 can be formed with an annular, generally C-shaped dove-tail flange section for the retention of seal structures 6 and 11.

Figure 2:
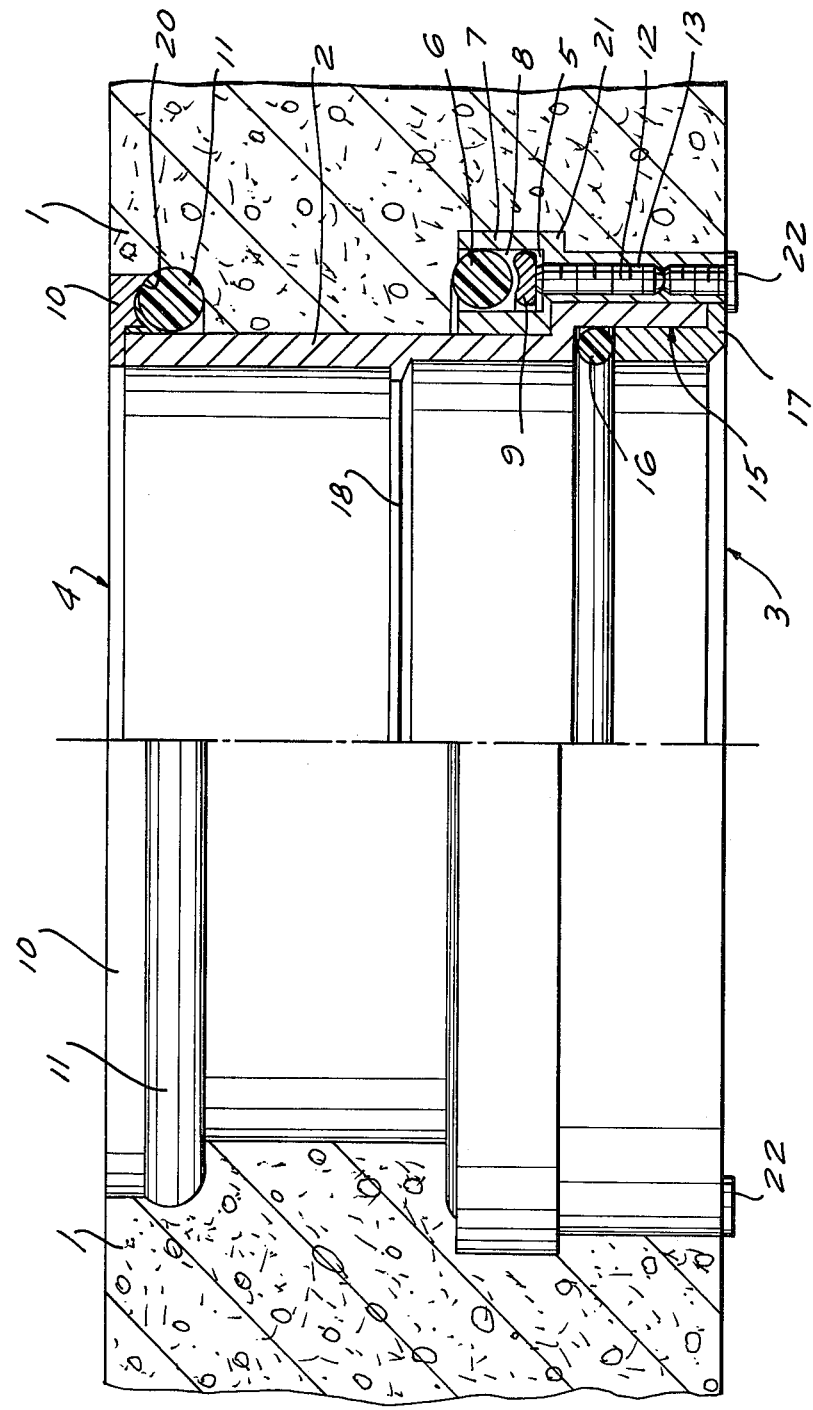
FIG. 2 shows a similar view of another embodiment of the present invention (separate shoulder)

In order to bring the pressure plate 9 into effective sealing contact with seal 6, adjustment screws 12 are provided, uniformly spaced (angularly equispaced about the axis of the duct 2) over the circumference of the assembly, which can be adjusted from service end or opening 3 of duct 2. Threading 13 is provided in the wall of duct 2 as is shown in FIG. 1, or in the wall of sleeve 21 as is shown in FIGs. 2 to 4. The threading can be covered by closure plates designated 22.

When the adjustment screws 12 are tightened in order to increase the pressure on the seal 6 via pressure-plate 9 an effective seal is formed in groove 8 by seal 6 with respect to wall 1. The pressure is countered by the respective counter-face 20 and is thus transmitted further to the other seal 11. Consequently, seal 11 is subjected to a corresponding pressure whereby duct 2 or the sleeve are slightly moved with respect to wall 1 in an axial direction. The seals 6 and 11 seat against inwardly projecting annular shoulders 19 of the wall 1.

Of course, it is within the scope of this present invention to perform the countering of the sealing pressure without seal 11, such that the counter-face rests directly on the material of wall 1.

For the retention of the retainer piece, not shown in the drawings, for the cable, piping or the like in duct 2, a further seal ring or retainer ring, designated 16, can be provided. To receive this, the inner diameter of duct 2 is enlarged at 15, and a retainer ring 17 or approximate L-section is inserted after mounting of seal 16 in fixed relationship to duct 2.

The retention of the retainer piece, not shown, is further assisted by the provision of a flange portion 18 arranged on the inside diameter of duct 2.

The material of construction for the duct 2 and the sleeve 21 can be any resin or other synthetic material and will normally be provided without any coating, structuring or the like surface modification in order to permit tightening of the assembly when the wall material is settling and/or solidifying.

I claim:

1. A duct assembly traversing a wall and adapted to receive electrical cables, pipes or the like, said assembly comprising:
   - a duct received in said wall and having a pair of axially separated ends exposed at opposite faces of said wall;
   - an outwardly extending annular shoulder disposed at one end of said duct, said duct shoulder being formed with an axially extending apron defining a groove opening away from said one end and toward the other end;
   - a sealing ring at least partly received in said groove;
   - an axially shiftable pressing ring received in said groove and displaceable against said sealing ring to compress said sealing ring against said duct and said wall in all-around sealing relationship;
   - actuating means operable from said one end of said duct for displacing said pressing ring against said sealing ring; and
   - a countershoulder operatively connected with the first-mentioned shoulder and axially drawn toward said wall upon operation of said actuating means to apply reaction force on said first shoulder to said wall in a direction opposite the force applied by said pressing ring to said sealing ring.

2. The assembly defined in claim 1, further comprising a second sealing ring disposed between said countershoulder and said wall and compressible by said countershoulder against said wall and said duct to seal the same in addition to the first-mentioned sealing ring.

3. The assembly defined in claim 2 wherein said first shoulder is formed unitarily with said duct and said apron on a wall of said duct.

4. The assembly defined in claim 2 wherein said first shoulder and said apron are formed as part of a packing body sealingly connected to said duct.

5. The assembly defined in claim 4 wherein said countershoulder is formed on said packing body.

6. The assembly defined in claim 2 wherein said countershoulder is formed on said other end of said duct.

7. The assembly defined in claim 2 wherein said shoulder is formed at an intermediate location along the length of said duct.

8. The assembly defined in claim 2 wherein said countershoulder is formed as a circumferential flange.

9. The assembly defined in claim 2 wherein said actuating means comprises a plurality of axially extending internally threaded bores formed in said shoulder, and respective screws threaded into said bores and bearing upon said pressing ring.

10. The assembly defined in claim 8, further comprising respective caps closing said bores.

11. The assembly defined in claim 10 wherein said caps have threaded portions received in said bores.

* * * * *